United States Patent [19]

Takamatsu et al.

[11] Patent Number: 4,778,257

[45] Date of Patent: Oct. 18, 1988

[54] ELECTRODE SPACING ON A MATRIX-TYPE LIQUID CRYSTAL DISPLAY PANEL

[75] Inventors: Toshiaki Takamatsu, Tenri; Fumiaki Funada, Yamatokoriyama; Masataka Matsuura, Tenri, all of Japan

[73] Assignee: Sharp Kabushiki Kaisha, Osaka, Japan

[21] Appl. No.: 372,949

[22] Filed: Apr. 29, 1982

[30] Foreign Application Priority Data

May 2, 1981 [JP] Japan .................................. 56-67516

[51] Int. Cl.$^4$ .................................. G02F 1/133
[52] U.S. Cl. .................................. 350/333; 350/336
[58] Field of Search .................................. 350/336, 335, 333; 340/784

[56] References Cited

U.S. PATENT DOCUMENTS

| 4,231,640 | 11/1980 | Funada et al. | 350/336 |
| 4,326,776 | 4/1982 | Banda | 350/336 |
| 4,335,937 | 6/1982 | Takamatsu et al. | 350/336 |

FOREIGN PATENT DOCUMENTS

| 0017049 | 2/1979 | Japan | 350/336 |

OTHER PUBLICATIONS

Kiwakami, "Brightness Uniformity in Liquid Crystal Displays", SID 80 Digest.

*Primary Examiner*—Stanley D. Miller
*Assistant Examiner*—David Lewis
*Attorney, Agent, or Firm*—Birch, Stewart, Kolasch & Birch

[57] ABSTRACT

An improved electrode assembly is disclosed herein especially for use in a matrix type liquid crystal display panel, which assures exact alignment of picture elements and increased yield of manufacture regardless of disalignment between scanning electrodes and signal electrodes in the electrode assembly. The display panel includes a first support carrying a plurality of the scanning electrodes, a second support carrying a plurality of the signal electrodes and disposed to face the first support and a layer of liquid crystal material interposed between the first and second supports. The signal electrodes are divided into an upper block and a lower block and the scanning electrodes are used in common for the upper and lower blocks. Pursuant to the present invention, the width of division between the upper and lower blocks of the signal electrodes is smaller than the spacing of the scanning electrodes.

1 Claim, 4 Drawing Sheets

ELECTRODE SPACING ON A MATRIX-TYPE LIQUID CRYSTAL DISPLAY PANEL

BACKGROUND OF THE INVENTION

This invention relates to an electrode assembly on a matrix type liquid crystal display panel, and more particularly it relates to a liquid crystal display panel with increased yield of manufacture.

In recent years, a substantial amount of effort in the field of liquid crystal matrix displays has been devoted to providing a high-density multi-line display, aiming at an improvement in image quality. Liquid crystal displays with matrix shaped electrode structures are quite favorable in fulfilling a power saving demand because of their capability of being excited with low power consumption.

A conventional drive technique for such a matrix type liquid crystal display, for example, the line sequential drive method as shown in FIG. 1, has long been known. A main memory 1 stores characters, symbols, patterns or the like and an intelligence signal converter 2 converts data contained in the memory 1 into the associated display patters. After those patterns are stored line by line into a buffer memory in a column driver 3, respective column electrodes $Y_1, Y_2, \ldots Y_n$ are supplied with those patterns. Row electrodes $X_1, X_2, \ldots X_m$ crossing the column electrodes, on the other hand, are sequentially enabled through a row driver 4, thereby displaying information contained in the buffer memory in a line-by-line fashion. A control 5 provides an operation control for the row and column driver circuits. A liquid crystal display with a matrix type electrode structure is labeled 6.

For the matrix type liquid crystal display panel, the greater the number of the rows (scanning the number) the higher the density and accuracy of display. However, with an increase in the number of the rows, the length of time at which a signal is applied per column, i.e., duty factor, is shortened and the problem of crosstalking arises. In particular, liquid crystal display panels show dull threshold characteristics and slow response characteristics, making it difficult to assure a satisfactory contrast. There are several ways to attempt to overcome this problem.

(1) The development of liquid crystal material having more definite threshold properties;

(2) A matrix address scheme in the optimum condition with an extended operating margin ($\alpha = V_{on}/V_{off}$); and (3) The design of an electrode structure with a seemingly higher resolution.

Though the first two ways (1) and (2) do not require modifications in the well known structure of liquid crystal cells, it appears almost impossible to increase drastically the number of excitable lines from the viewpoint of the present-day progress of liquid crystal materials, etc. Contrarily, the problem with the last method (3) is that the liquid crystal cells are sophisticated in construction but, it is actually possible to increase the number of excitable lines by a factor of two or more.

Typical ways of making possible the last approach (3) are as follows:

(a) double electrode structure
(b) vertical partition, and
(c) two-layered structure.

These methods may be adopted alone or in combination for achieving the intended purpose. Such a combination has been proposed by co-pending application Ser. No. 921,062 June 30, 1978, MATRIX TYPE LIQUID CRYSTAL DISPLAY PANEL by F. Funada et al, now U.S. Pat. No. 4,231,640.

Conventional electrode assemblies of matrix type liquid crystal display panels are shown in FIGS. 2 and 3, in which FIG. 2 shows a bare vertical partition and a combined vertical pertition and two-layered structure and FIG. 3 shows a combined vertical partition and double electrode and a combined vertical partition, double electrode and two-layered structure. This sort of electrode assembly as seen in FIGS. 2 and 3 is designed such that the distance $l_x$ between a particular scanning electrode $X_m$ and an adjoining scanning electrode $X_{m+1}$ in a horizontal line each for defining a respective one of picture elements is equal to that $l_y$ between a particular upper block signal electrode $Y'_j$ and a lower block signal electrode $Y_j$ in a vertical direction. It is however very difficult to align both of those electrodes in an exact positioned relationship as seen in FIGS. 2 and 3 because of very narrow widths and distances of the respective electrodes in fixing relative positions between an electrode support carrying all of the scanning electrodes and another electrode support carrying all of the signal electrodes during manufacture of display panels.

For example, in the event that the edges 11 and 12 of the scanning electrodes $X_{m+1}$ along its widths thereof are in disalignment with respect to lowest edge 21 of the upper block signal electrode $Y_j$, and the upper edge of the lower signal block electrode $Y_j$ as shown in FIG. 4 or 6, hatched areas 13 and 23 where the electrodes do not overlap are of no use as part of a display panel at all.

Should the display panel with such disaligned electrodes be excited for display operation, the distance $l_3$ between picture elements 101 and 102 corresponding to $X_m$ and $X_{m+1}$ becomes greater than that $l_1$ between picture elements 100 and 101 corresponding to the scanning electrodes $X_{m-1}$ and $X_m$ as viewed from FIG. 5 or 7. The display screen is divided into an upper block and a lower block, thus deteriorating image quality of the display screen.

The conventional method therefore has the problem of decreased yield of manufacture because it requires exact alignment between the edges of the scanning electrodes and those of the signal electrodes.

OBJECT AND SUMMARY OF THE INVENTION

Accordingly, it is an object of the present invention to provide an electrode assembly of a liquid crystal display panel which overcomes the above discussed problems and especially assures uniform and quality image and high yield of manufacture even when scanning electrodes are out of alingment with respect to signal electrodes to some extent.

The above object is achieved by the present invention by providing a matrix type liquid crystal display device comprising a first support carrying a plurality of scanning electrodes, a second support carrying a plurality of signal electrodes and disposed to face said first support for setup of a matrix type electrode structure and a layer of liquid crystal material interposed between said first and second supports, said signal electroder being divided into an upper block and a lower block and said scanning electrodes being in common for said upper and lower blocks, wherein said matrix type electrode structure is designed such that the width of division between said upper and lower blocks of said signal electrodes is smaller than the spacing of said scanning electrodes.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
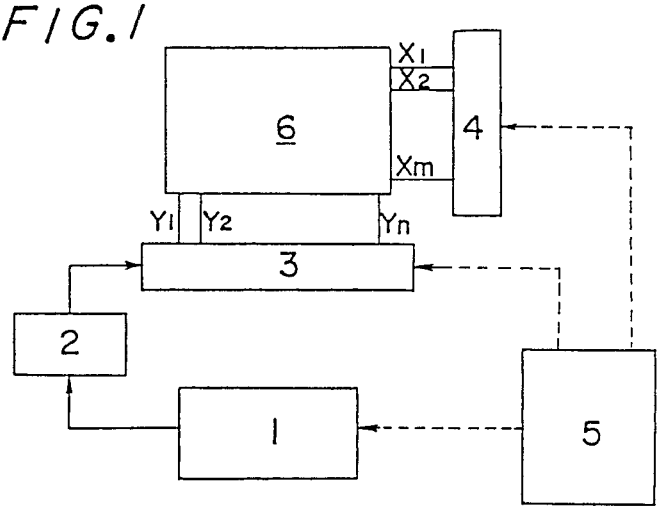
FIG. 1 is a circuit diagram of a typical control scheme for a matrix type liquid crystal display panel.
Figure 2:
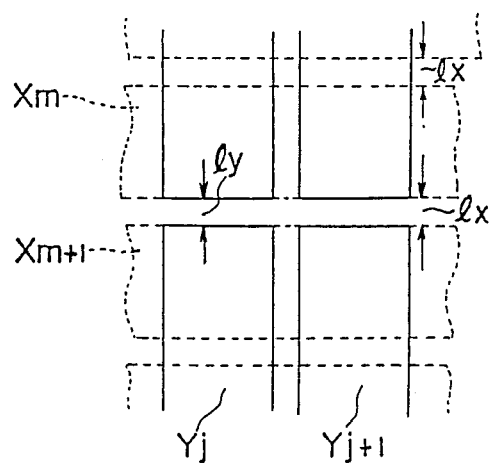
FIGS. 2 and 3 are partial plan views of conventional electrode assemblies of liquid crystal display panels.
Figure 3:
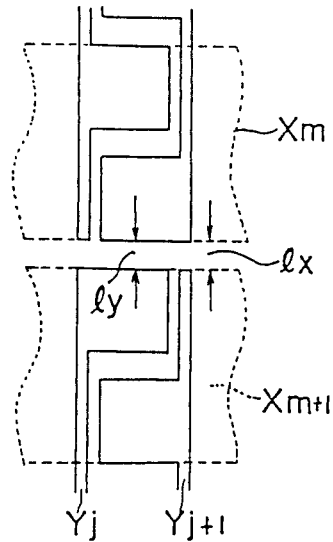
Figures 4, 5:
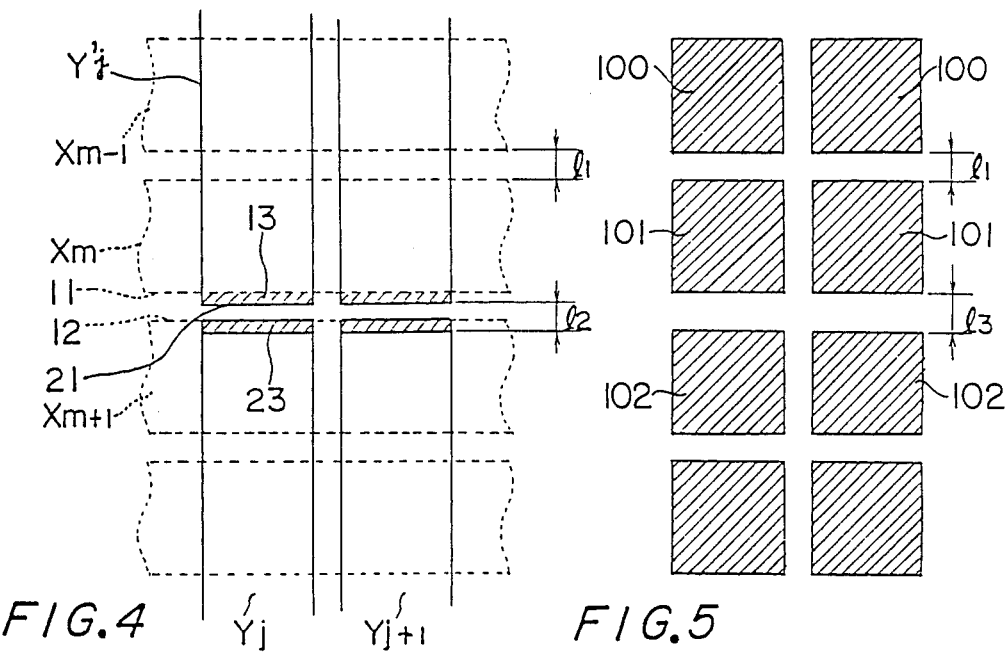
FIG. 4 is an illustration for explaining disalignment of scanning electrodes and signal electrodes in the conventional electrode assemblies as shown in FIG. 2.
FIG. 5 is an illustration of picture elements in the state as shown in FIG. 4.
Figures 6, 7:
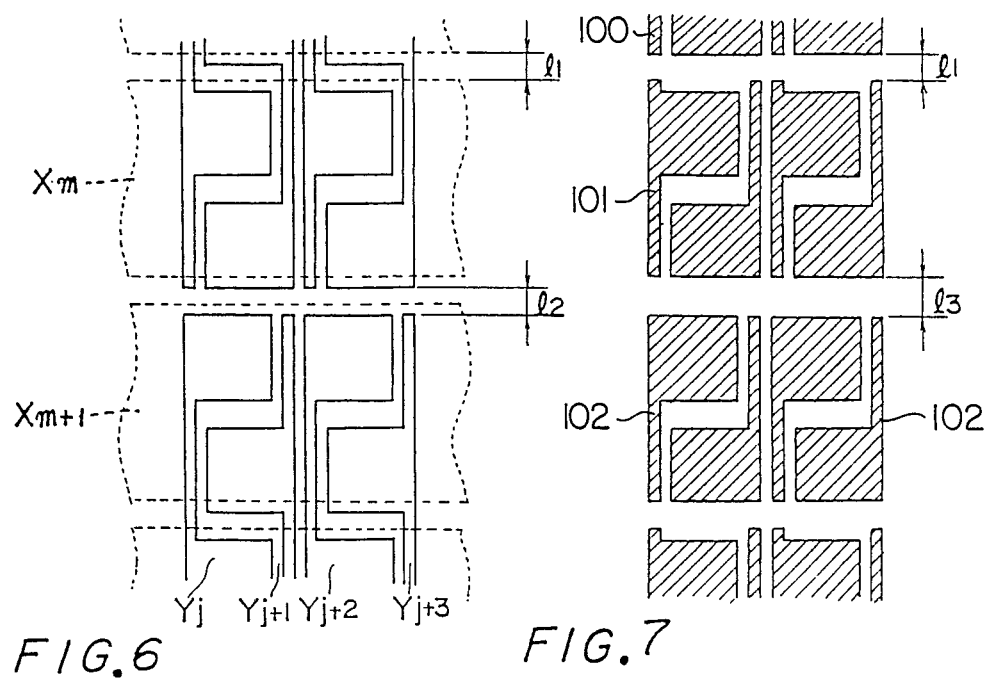
FIG. 6 is an illustration for explaining disalignment of scanning electrodes and signal electrodes in the conventional electrode assembly as shown in FIG. 3.
FIG. 7 is an illustration of picture elements in the state as in FIG. 6.
Figures 8, 9:
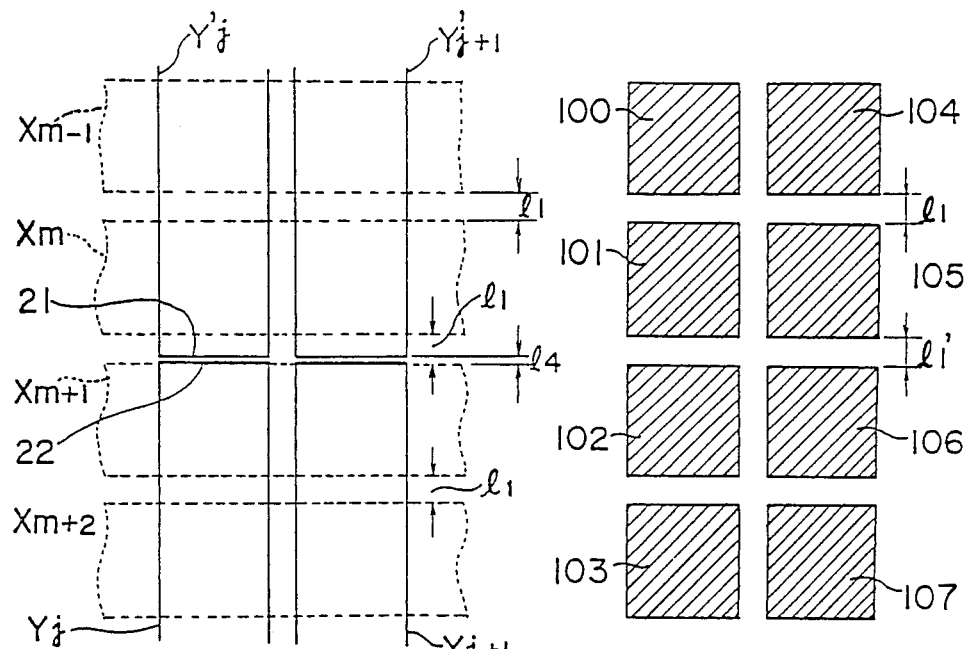
FIG. 8 is a plan view of part of an electrode assembly according to an embodiment of the present invention.
FIG. 9 is an illustration of picture elements in the embodiment as shown in FIG. 8.

Referring now to FIG. 8, there is illustrated an embodiment of the present invention in where an electrode assembly of the vertical partition scheme for use in a matrix type liquid crystal display panel includes scanning electrodes $X_{m-}$, $X_m$, $X_{m+1}$, $X_{m+2}$ and so forth. Those scanning electrodes $X_{m-}$, $X_m$, $X_{m+1}$, $X_{m+2}$, and so forth are carried on a scanning electrode support (not shown) and aligned and juxtaposed substantially in an equal spacing $l_1$.

The electrode assembly further includes signal electrodes $Y'_j$, $Y'_{j+1}$ in an upper block $Y'$ and signal electrodes $Y_j$, $Y_{j+1}$ in a lower block $Y$, all of which are disposed on a signal electrode support (not shown). It is noted that the distance $l_4$ between the bottom edge 21 of the upper block signal electrode $Y'_j$ and the top edge 22 of the lower block signal electrode $Y_j$ is selected to be smaller than the spacing $l_1$ between the respective scanning electrodes $X_{m-}$, $X_m$ and so forth. The distance between the electrodes $Y'_{j+1}$ and $Y_{j+1}$ are selected in the same manner as the distance $l_4$.

The electrode supports carrying the above described electrodes are disposed to face each other for setup of the matrix electrode assembly and liquid crystal material is injected therebetween in a well-known manner. When signals are applied to the respective scanning electrodes $X_{m-}$, $X_m$, $X_{m+1}$, $X_{m+2}$ and the signal electrodes $Y'_j$, $Y_j$, $Y'_{j+1}$, $Y_{j+1}$, the respective ones of the picture elements 100, 101, 102 103 to 107 in FIG. 9 and are sequentially energized as a function of a developing electric field.

Since the distance $l_4$ between the upper block and lower block signal electrodes is selected to be smaller than the spacing $l_1$ of the scanning electrodes and in other words the signal electrodes are aligned lengthwise in the above embodiment, the respective ones of the scanning electrodes never fail to face the signal electrodes even if the scanning electrodes are somewhat out of alignment with the signal electrodes. As a result, the vertical spacings $l_1$ and $l'_1$ of the picture elements 100 - 103 are equal to the spacing $l_1$ of the scanning electrodes. This prevents the picture elements in the upper block from being viewed separately from those in the lower block and assuring quality image on the liquid crystal display panel.

Figures 10, 11:
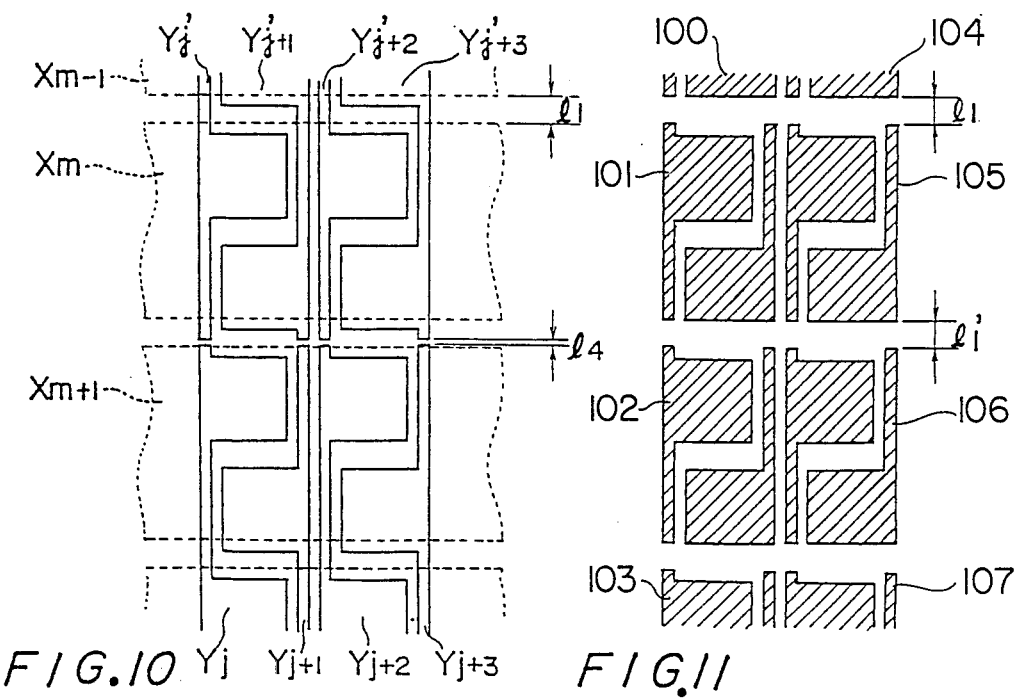
FIG. 10 is a partial plan view of another embodiment of the present invention.
FIG. 11 is an illustration of picture elements as in the embodiment of FIG. 10.

In another embodiment of FIG. 10, the signal electrodes are split into the upper and lower blocks and the signal electrodes are intertwined with each other. The upper block signal electrodes are designated by $Y'_j$, $Y'_{j+1}$, $Y'_{j+2}$, $Y'_{j+3}$, whereas the lower block signal electrodes are designated by $Y_j$, $Y_{j+1}$ and $Y_{j+3}$. In this embodiment, the width $l_4$ of division of the upper and lower block signal electrodes is likewise smaller than the spacing $l_1$ of the scanning electrodes, with the result in that $l_1 = l'_1$ in a display pattern of elements 100 to 107 as viewed in FIG. 11.

Figure 12:
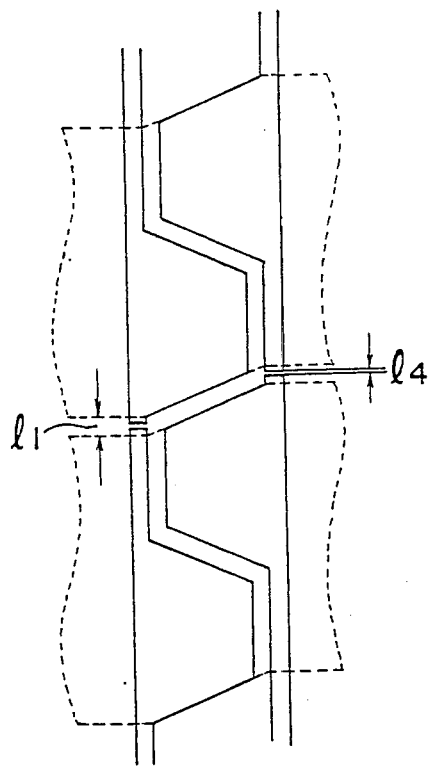
FIGS. 12 and 13 are partial plan views of modified embodiments of the present invention.
Figure 13:
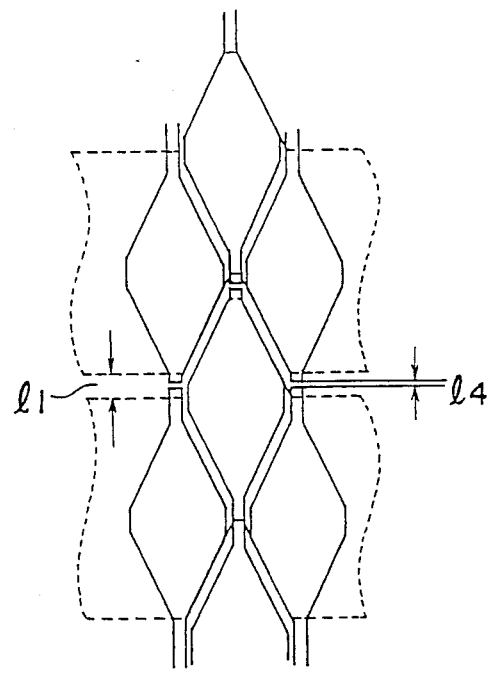
Figure 8A:
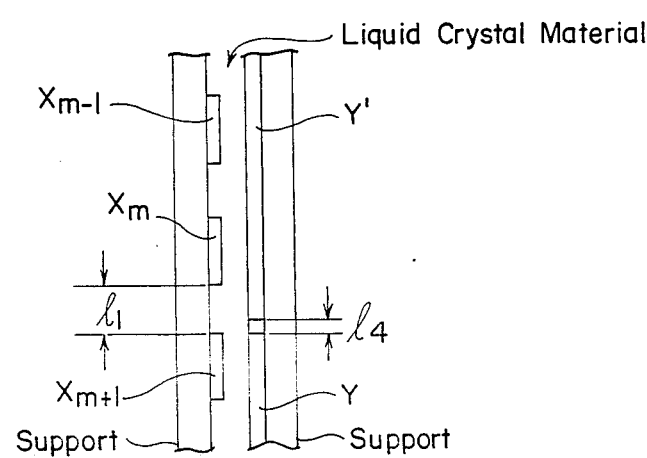
FIG. 8A is a cross-sectional view of a display panel illustrating the electrode assembly of FIG. 8.

In addition to the above illustrated two embodiments, the present invention is equally applicable to any other configuration of the electrode assembly, for example, one in which the signal electrodes are trapezoid and intertwined with each other as shown in FIG. 12 and one in which the signal electrodes are substantially diamond-shaped and aligned in zigzags as in FIG. 13. In any case, the width $l_4$ of division between the upper and lower block signal elecrodes is selected to be smaller than the spacing $l_1$ between the scanning electrodes.

As is clearly understood from the foreging description, the present invention is applicable not only to (i) mere vertical partition structure wherein the strip-shaped signal electrodes are split into the upper and lower blocks (ii) combined vertical partition and double electrode structure but also to (iii) combined vertical partition and two-layered structure, (iv) combined vertical partition, double-electrode and two-layered structure.

As stated hereinbefore, the present invention provides the electrode assembly for matrix type liquid crystal display panel in which the distance between the upper and lower block signal electrodes is smaller than the spacing between the scanning electrodes and in other words the signal electrodes are aligned to extend along its length. Accordingly, the vertical distance of the picture elements is determined by the spacing of the scanning electrodes so that the picture elements are equally spaced even if the scanning electrodes are somewhat out of alignement with the display electrodes. The present invention therefore ensures quality of an image on the display panel and increased yield of manufacture.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A matrix type liquid crystal display device consisting essentially of:

a first support carrying a plurality of substantially rectangular scanning electrodes, adjacent electrodes being equally spaced in parallel relationship along a given direction by a first distance;

a second support carrying a plurality of signal electrodes disposed to face the scanning electrodes on said first support for forming a matrix-type electrode structure, said signal electrodes being divided into first and second substantially rectangular blocks, said first and second blocks having the adjacent edges of the respective rectangles spaced along said given direction by a second distance which is less than the first distance between said adjacent scanning electrodes; and a liquid crystal material interposed between said first and second supports.

* * * * *